(12) United States Patent
Anderson et al.

(10) Patent No.: US 8,629,800 B2
(45) Date of Patent: Jan. 14, 2014

(54) GROUND VEHICLE COLLISION PREVENTION SYSTEMS AND METHODS

(75) Inventors: David M. Anderson, Sammamish, WA (US); David L. Banks, Renton, WA (US); Robert L. Avery, Woodinvile, WA (US); Aydin Akdeniz, Langley, WA (US)

(73) Assignee: The Boeing Company, Chicago, IL (US)

( * ) Notice: Subject to any disclaimer, the term of this patent is extended or adjusted under 35 U.S.C. 154(b) by 600 days.

(21) Appl. No.: 12/972,265

(22) Filed: Dec. 17, 2010

(65) Prior Publication Data

US 2011/0087417 A1   Apr. 14, 2011

Related U.S. Application Data

(63) Continuation-in-part of application No. 12/538,441, filed on Aug. 10, 2009, now Pat. No. 7,869,305, and a continuation-in-part of application No. 10/955,818, filed on Sep. 30, 2004, now Pat. No. 7,379,165.

(51) Int. Cl.
    *G01S 13/93* (2006.01)

(52) U.S. Cl.
    USPC ............................................ 342/109; 367/909

(58) Field of Classification Search
    USPC ............. 367/99, 907; 701/301, 300; 340/903; 342/69, 72, 109
    See application file for complete search history.

(56) References Cited

U.S. PATENT DOCUMENTS

| 3,360,775 | A | 12/1967 | Schroeder |
| 4,926,171 | A * | 5/1990 | Kelley ........................ 701/301 |
| 5,249,157 | A | 9/1993 | Taylor |
| 5,314,037 | A | 5/1994 | Shaw et al. |
| 5,754,123 | A | 5/1998 | Nashif et al. |
| 5,983,161 | A | 11/1999 | Lemelson et al. |
| 6,025,797 | A * | 2/2000 | Kawai et al. .................... 342/72 |
| 6,133,867 | A * | 10/2000 | Eberwine et al. ............... 342/29 |
| 6,246,320 | B1 | 6/2001 | Monroe |
| 6,275,773 | B1 | 8/2001 | Lemelson et al. |
| 6,281,786 | B1 | 8/2001 | Adachi et al. |
| 6,516,273 | B1 * | 2/2003 | Pierowicz et al. ............ 701/301 |
| 6,594,614 | B2 | 7/2003 | Studt et al. |
| 6,615,138 | B1 | 9/2003 | Schiffmann et al. |
| 6,784,791 | B2 | 8/2004 | Rao et al. |
| 6,794,987 | B2 | 9/2004 | Schiffmann et al. |

(Continued)

OTHER PUBLICATIONS

PCT Invitation to Pay Additional Fees for Application No. PCT/US2005/03332, dated Nov. 17, 2006, 8 pages.

*Primary Examiner* — Daniel Pihulic (74) *Attorney, Agent, or Firm* — Yee & Associates, P.C.

(57) ABSTRACT

A method and apparatus for detecting a vehicle. An apparatus comprises a proximity detection system, a vehicle management system, and a notification system. The proximity detection system is associated with an aircraft and operably connected to a transducer. The proximity detection system is configured to determine a distance of a vehicle from a surface of the aircraft and a velocity of the vehicle relative to the aircraft. The vehicle management system operably connected to the proximity detection system. The vehicle management system is configured to determine a time the vehicle will be a threshold distance from the surface of the aircraft and an threshold amount of time to bring the vehicle to a predetermined velocity. The notification system is associated with the proximity detection system and configured to generate a notification signal in response to a determination that the time is less than the threshold amount of time.

21 Claims, 6 Drawing Sheets

(56) References Cited

U.S. PATENT DOCUMENTS

| | | |
|---|---|---|
| 7,103,464 B2 * | 9/2006 | Zielke ............................ 340/903 |
| 7,379,165 B2 * | 5/2008 | Anderson et al. ............ 356/5.05 |
| 7,495,600 B2 | 2/2009 | Rees et al. |
| 7,511,612 B1 | 3/2009 | Monroe |
| 7,579,980 B2 * | 8/2009 | Anderson et al. ............. 340/903 |
| 7,817,843 B2 * | 10/2010 | Senibi et al. .................. 382/141 |
| 7,822,258 B2 * | 10/2010 | Senibi et al. .................. 382/141 |
| 7,869,305 B2 * | 1/2011 | Anderson et al. ............... 367/99 |
| 8,013,722 B2 * | 9/2011 | Breuer et al. ................. 340/903 |
| 8,401,774 B2 * | 3/2013 | Ravenscroft et al. ......... 701/301 |
| 2002/0109625 A1 | 8/2002 | Gouvary |
| 2005/0209791 A1 * | 9/2005 | Senibi et al. .................... 702/33 |
| 2006/0007021 A1 | 1/2006 | Konya et al. |
| 2006/0064245 A1 | 3/2006 | Gilbert |
| 2006/0066470 A1 * | 3/2006 | Anderson et al. ............... 342/29 |
| 2006/0071668 A1 * | 4/2006 | Senibi et al. ................... 324/537 |
| 2008/0172178 A1 * | 7/2008 | Anderson et al. ............. 701/301 |
| 2009/0295622 A1 * | 12/2009 | Anderson et al. ............... 342/71 |
| 2010/0191450 A1 * | 7/2010 | Ravenscroft et al. ......... 701/301 |
| 2011/0087417 A1 * | 4/2011 | Anderson et al. ............... 701/96 |

\* cited by examiner

GROUND VEHICLE COLLISION PREVENTION SYSTEMS AND METHODS

This application is a continuation-in-part of application Ser. No. 12/538,441, filed Aug. 10, 2009, status pending, which is herein incorporated by reference. Application Ser. No. 12/538,441 is a division of U.S. Pat. No. 7,379,165 filed Sep. 30, 2004 which is here incorporated by reference.

BACKGROUND INFORMATION

1. Field

This invention relates generally to aircraft ground operations, and more particularly to ground vehicle collision prevention systems and methods.

2. Background

Passenger aircraft generally require the performance of a variety of different tasks following the termination of a specific flight. For example, the aircraft must be refueled, cargo must be unloaded, the cabin of the aircraft must be cleaned, the lavatory wastewater must be removed, and the galley must be re-provisioned, among other tasks. Accordingly, relatively long turnaround times are often encountered in the operation of passenger aircraft, which adversely affects the return on investment for an aircraft operator since the aircraft cannot generate revenue while sitting on the ground. Considerable effort has therefore been devoted to systems and methods for making the aircraft ready for flight in less time.

Figure 1:
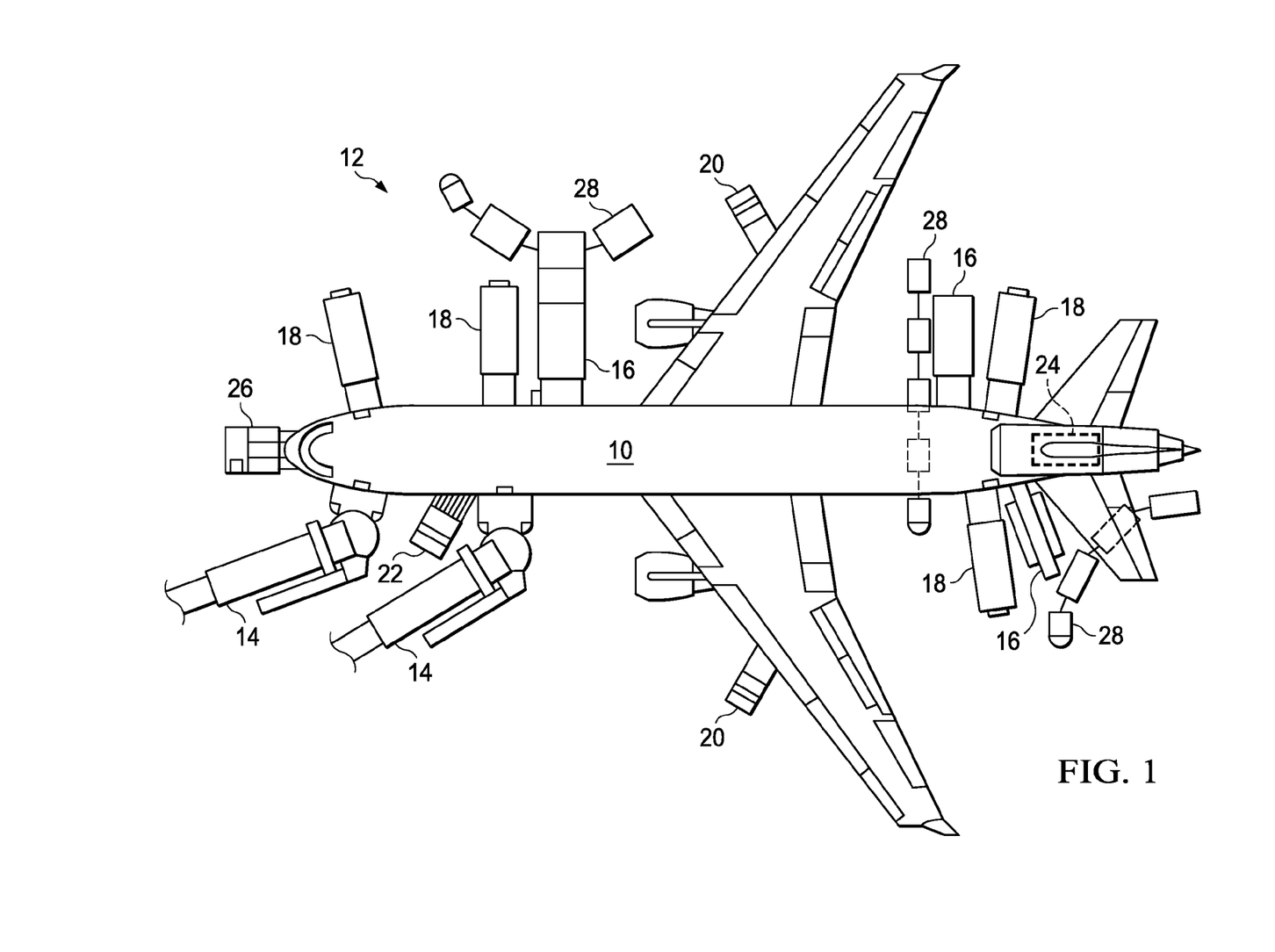
FIG. 1 is a plan view of a transport aircraft positioned in a parking area at an airport in accordance with the prior art; and, FIG. 2 is a block diagrammatic view of a ground vehicle collision prevention system according to an embodiment of the invention.

One conventional method for preparing an aircraft for flight involves the use of a number of special-purpose ground vehicles that may simultaneously perform specific ground service tasks. FIG. 1 is a plan view of a transport aircraft 10 positioned in a parking area 12 at an airport that will be used to describe at least a portion of the ground service vehicles commonly encountered during aircraft service operations. The ground service vehicles generally maneuver about the aircraft 10 to occupy positions about the aircraft 10 in order to perform a specific task related to servicing the aircraft 10. For example, passenger-loading ramps 14 may be maneuvered into position near aircraft exit locations to permit passenger access to the aircraft 10. Cargo loading conveyors 16 may be positioned adjacent to cargo compartment doors to permit cargo to be loaded and unloaded from the aircraft 10. Cabin service vehicles 18 may also be positioned near exit locations in the aircraft 10 to permit the galley to be re-supplied, and to perform other tasks related to maintaining the cabin of the aircraft 10. Fuel service vehicles 20 may be positioned near fuel service ports in order to refuel the aircraft 10. A potable water vehicle 22 and a lavatory service vehicle 24 may be positioned near the aircraft 10 in order supply the aircraft 10 with potable water, and to remove wastewater from the airplane 10. Still other types of ground vehicles may maneuver about the aircraft 10. For example, a tow tractor 26 is generally required to move the aircraft 10 about the parking area 12. Moreover, cargo pallet trains 28 may frequently maneuver about the aircraft 10 so that cargo may be transported from an airport terminal facility to the cargo loading conveyors 16.

Consequently, during the performance of various ground service operations, a plurality of service vehicles may be maneuvering and/or positioned about the aircraft 10. A risk therefore exists that a service vehicle may inadvertently collide with a portion of the aircraft 10 while moving about the aircraft 10. Such a collision may result in significant damage to the aircraft 10, requiring a costly and time-consuming repair before the aircraft 10 is returned to service. Non-metallic composite components are increasingly replacing conventional metallic structures on passenger aircraft in order to reduce weight. Damage to non-metallic composite components may be costly to repair. Moreover, selected portions of the aircraft 10 are particularly susceptible to damage while the aircraft 10 is positioned on the ground. For example, landing gear doors, cargo loading doors and passenger access doors are generally maintained in an open position during ground operations, and may be relatively easily damaged by even a minor collision. Even in cases where damage to the aircraft 10 is less significant, relatively expensive flight delays are often incurred since a mandated inspection of the damaged area must be performed to determine if the damage is within allowable limits.

Accordingly, there is a need for a systems and methods that at least partially prevent a collision between a ground service vehicle and an aircraft.

SUMMARY

The present invention comprises systems and methods for preventing collisions between aircraft and ground vehicles. In one aspect, a ground vehicle collision prevention system includes a proximity detection system positioned on an aircraft and coupled to at least one transducer proximate to at least one selected structural portion of the aircraft. The proximity detection system is operable to emit ranging signals through the at least one transducer and to receive reflected signals through the at least one transducer to determine the position of an object within a ranging area adjacent to the selected structural portion. The system further includes at least one alarm device coupled to the proximity detection system that is responsive to a proximity alarm signal generated by the proximity detection unit. In another aspect of the invention, a method of preventing a collision between an aircraft and a ground service vehicle includes determining a distance between the ground service vehicle and a selected structural portion of the aircraft when the vehicle is positioned in a ranging area about the aircraft. The method further includes generating a proximity alarm based upon the distance.

In one advantageous embodiment, an apparatus comprises a proximity detection system, a vehicle management system, and a notification system. The proximity detection system is associated with an aircraft and operably connected to a transducer. The proximity detection system is configured to determine a distance of a vehicle from a surface of the aircraft and a velocity of the vehicle relative to the aircraft. The vehicle management system is operably connected to the proximity detection system. The vehicle management system is configured to determine a time the vehicle will be a threshold distance from the surface of the aircraft and a threshold amount of time to bring the vehicle to a predetermined velocity. The notification system is associated with the proximity detection system and configured to generate a notification signal in response to a determination that the time is less than the threshold amount of time.

In another advantageous embodiment, a prevention system comprises a proximity detection system, a vehicle management system, and a notification system. The proximity detection system is associated with an aircraft and operably connected to a transducer. The proximity detection system configured to identify a distance of a vehicle from the aircraft, a velocity of the vehicle relative to the aircraft, a position of the vehicle relative to the aircraft, and a number of dimensions associated with the vehicle in response to detecting the vehicle within an area adjacent to the aircraft. The vehicle management system is associated with the aircraft and operably connected to proximity detection system. The vehicle management system is configured to receive information regarding a plurality of dimensions associated with a number of surfaces of the aircraft, map the number of dimensions associated with the vehicle with the plurality of dimensions associated with the number of surfaces of the aircraft based on the position of the vehicle relative to the aircraft to form a mapping, determine a portion of the vehicle that will be a threshold distance from a surface in the number of surfaces of the aircraft based on the mapping and the velocity of the vehicle relative to the aircraft, determine a time the portion of the vehicle will be the threshold distance from the surface of the aircraft based on the mapping and the velocity of the vehicle relative to the aircraft, and determine a threshold amount of time to bring the vehicle to a predetermined velocity. The notification system is associated with the vehicle management system and configured to generate a notification signal in response to a determination that the time is less than the threshold amount of time.

In yet another advantageous embodiment, a method may be provided for detecting vehicles. An area adjacent to an aircraft is monitored for a vehicle. The area is monitored using a transducer associated with the aircraft. A distance of the vehicle from a surface of the aircraft and a velocity of the vehicle relative to the aircraft are determined in response to detecting the vehicle within the area adjacent to the aircraft. A time the vehicle will be a threshold distance from the surface of the aircraft is determined. A threshold amount of time to bring the vehicle to a predetermined velocity is determined. A notification signal is generated in response to a determination that the time is less than the threshold amount of time.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

The present invention relates to ground vehicle collision prevention systems and methods. Many specific details of certain embodiments of the invention are set forth in the following description and in FIGS. 2 through 9 to provide a thorough understanding of such embodiments. One skilled in the art, however, will understand that the present invention may have additional embodiments, or that the present invention may be practiced without several of the details described in the following description.

Figure 2:
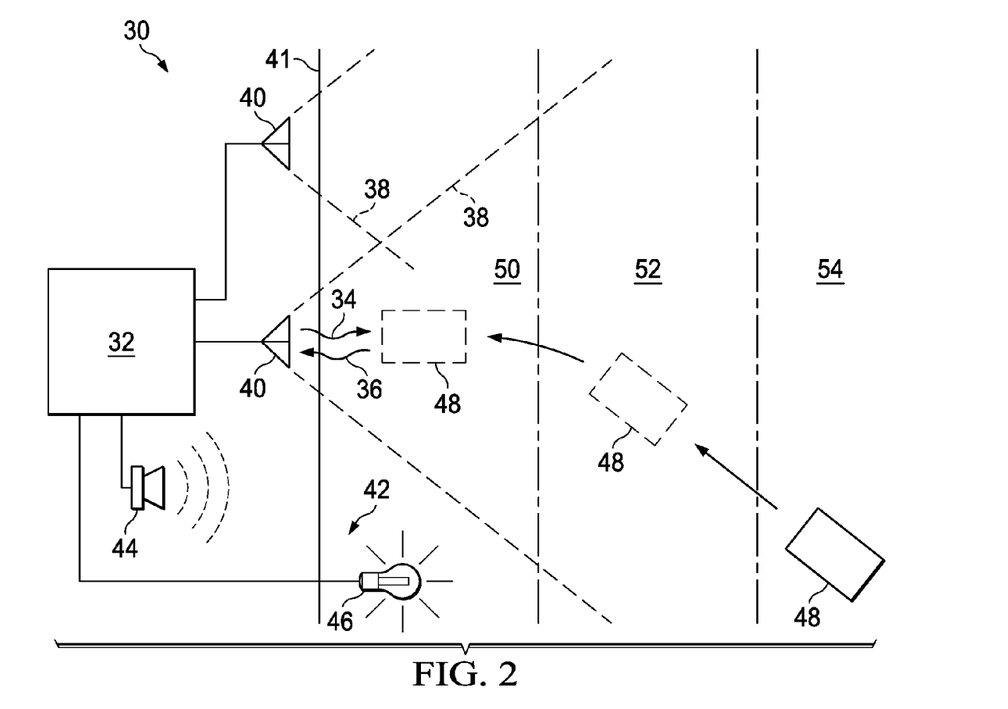

FIG. 2 is a block diagrammatic view of a ground vehicle collision prevention system 30 according to an embodiment of the invention. The system 30 includes a proximity detection system 32 operable to generate ranging signals 34 and to detect return signals 36 reflected from objects positioned within a ranging area 38. The proximity detection system 32 is further coupled to at least one transducer 40 (two shown) that is positioned proximate to an aircraft structural portion 41. The aircraft structural portion 41 may comprise a skin portion of a fuselage of an aircraft, or other portions coupled to the fuselage, such as a passenger or a cargo door. The portion 41 may also comprise a portion of at least one wing coupled to the fuselage. Moreover, aircraft structural portion 41 may comprise a structure that protrudes from fuselage, such as a drain mast, Pitot tube, or other similar structures. The proximity detection system 32 may be positioned on the aircraft, or may be positioned proximate to the aircraft on a temporary support that is placed near the aircraft when the aircraft is parked on the ground.

The at least one transducer 40 is operable to emit the ranging signals 34 and to collect the return signals 36. Accordingly, and in a particular embodiment, the proximity detection system 32 and the at least one transducer 40 may comprise a radio frequency detection and ranging apparatus (RADAR) operating at microwave frequencies. Alternately, and in another particular embodiment, the unit 32 and the at least one transducer 40 may comprise an ultrasonic detection and ranging apparatus, wherein the transducer 40 is configured to emit ranging signals 34 at ultrasonic frequencies, and also receive ultrasonic return signals 36. In other particular embodiments, the proximity detection system 32 and the at least one transducer 40 may comprise a light-based detection and ranging apparatus (LIDAR) using a photo-emitter and a photo-detector, or an electromagnetic detection and ranging device that relies on inductive effects to detect an object positioned within the ranging area 38, although other detection and ranging apparatus are known to those skilled in the art.

The system 30 further includes at least one alarm device 42, which may include an audio alarm device 44 and a visual alarm device 46. The audio alarm device 44 and the visual alarm device 46 are operable to generate acoustic energy and light, respectively, corresponding to an alarm signal generated by the proximity detection system 32. The at least one alarm device 42 may be positioned remotely from the proximity detection system 32 so that the acoustic energy and light corresponding to the alarm signal may be perceived within the ranging area 38. For example, the audio alarm device 40 may comprise a loudspeaker positioned within a wheel well opening of an aircraft, while the visual alarm device 44 may include an incandescent light source positioned on an exterior portion of the aircraft structural portion 41.

Still referring to FIG. 2, the operation of the ground vehicle collision prevention system 30 will now be discussed. The proximity detection system 32 generates ranging signals 34 that are reflected from a ground service vehicle 48 positioned within the ranging area 38 to yield return signals 36. Accordingly, a distance between the aircraft structural portion 41 and the ground service vehicle 48 may be determined by measuring a time delay between the emission of the ranging signal 34 and the detection of the return signal 36, and multiplying the resulting time delay by the propagation speed of the ranging signal 34. Accordingly, for a ranging apparatus that employs electromagnetic emissions, the speed of light is used as the propagation speed, while for an acoustic-based ranging apparatus, an acoustic propagation speed is appropriate. The proximity detection system 32 may be configured to generate alarm signals depending on the distance between the aircraft structural portion 41 and the ground service vehicle 48.

In one particular embodiment, the ranging area 38 may be sub-divided into a near field region 50, an intermediate field region 52, and a far-field region 54 so that the proximity detection system 32 generates a first alarm signal characteristic when the ground service vehicle 48 is positioned in the near field region 50, a second alarm signal characteristic when positioned in the intermediate field region 52, and a third alarm signal characteristic when the ground service vehicle 48 is positioned in the far field region 54. The first, second and third signal characteristics may be selected to provide an operator of the vehicle 48 with a distinct and readily recognizable aural or visual indication that reflects the distance between the vehicle 48 and the aircraft structural portion 41. In another particular embodiment, the first signal characteristic includes a steady audible tone having a frequency of approximately 3000 Hz, the second signal characteristic includes an intermittent audible tone having a first repetition rate and a frequency of approximately 1500 Hz, while the third signal characteristic includes an intermittent audible tone having a second repetition rate and a frequency of approximately 500 Hz. Thus, as the vehicle 48 moves from the far-field region 54 to the near field region 50, the operator of the vehicle 48 perceives a succession of different aural indications that vary in frequency and repetition rate.

Still other alarm signal characteristics may be employed to provide the operator of the vehicle 48 with an aural indication of the distance between the vehicle 48 and the aircraft structural portion 41. For example, the proximity detection system 32 may be configured to generate a plurality of audible sounds, so that a distinct sound applies to a selected portion of the aircraft structure. For example, an intermittent audible tone having a pulse duration that is continuously frequency modulated from approximately Hz to approximately Hz is readily recognizable as a "chirp" which may correspond to a first selected aircraft structural portion, while another intermittent audible tone with a pulse duration that is step-wise frequency modulated from approximately 1500 Hz to approximately 1000 Hz is readily recognizable as a "cuckoo" which may correspond to a second selected aircraft structural portion. Having different distinct sounds assigned to different portions of the aircraft structure may advantageously assist operators of different vehicles approaching different portions of the aircraft structure to discriminate between warning signals.

In another particular embodiment, the proximity detection system 32 of FIG. 2 may be configured with a voice synthesis apparatus operable to generate a verbal alarm signal characteristic, which advantageously may also provide a verbal indication of the location of the system 30. For example, the voice synthesis apparatus may be configured to generate a verbal alarm signal such as "REAR CARGO DOOR-CAUTION" when the vehicle 48 is positioned in the intermediate field region 52 and generate a verbal alarm signal such as "REAR CARGO DOOR-WARNING" when the vehicle 48 moves into the near field region 50.

Figure 3:
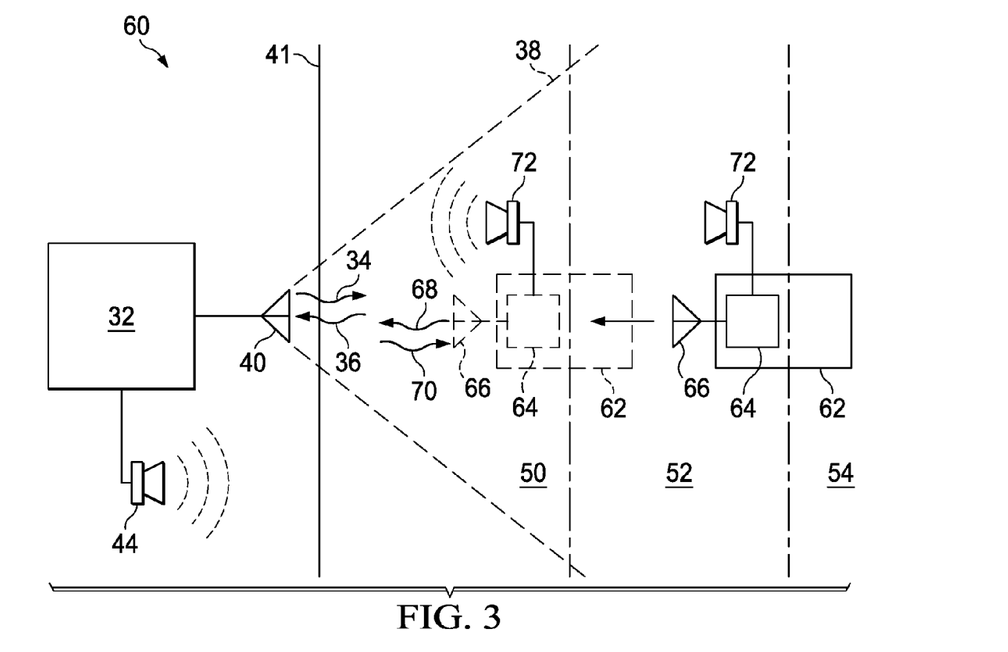
FIG. 3 is a block diagrammatic view of a ground vehicle collision prevention system according to another embodiment of the invention.

FIG. 3 is a block diagrammatic view of a ground vehicle collision prevention system 60 according to another embodiment of the invention. Many of the details of the system 60 have been discussed in detail in connection with previous embodiments, and in the interest of brevity, will not be described further. The system 60 includes a proximity detection system 32 coupled to at least one transducer 40 that is positioned proximate to an aircraft structural portion 41. The transducer 40 emits the ranging signals 34 generated by the proximity detection system 32 and collects the return signals 36 reflected from a ground service vehicle 62. In this embodiment, a ground service vehicle 62 includes a proximity detection system 64 that is coupled to at least one transducer 66 that is positioned on a portion of the vehicle 62 that emits ranging signals 68 generated by the proximity detection system 64 and to collect return signals 70 reflected from the aircraft structural portion 41. The proximity detection system 64 is also configured to generate alarm signals depending on the distance between the aircraft structural portion 41 and the ground service vehicle 62, which may be communicated to an audio alarm device 72, although a visual alarm device (not shown in FIG. 3) may also be present.

The foregoing system 60 provides two independent proximity detection units that advantageously provide redundancy. As a result, if a failure occurs in either the proximity detection system 32 or the proximity detection system 64, or in any of the components associated with the proximity detection system 32 or the proximity detection system 64, the collision avoidance capabilities afforded by the system 60 remain intact. This capability may be important when power has been removed from the aircraft, or a failure has occurred in the proximity detection system 32. The foregoing system 60 has further advantages. For example, if the transducer 40 is inadvertently obstructed and cannot exchange the signals 30 and 36 with the vehicle 62, the proximity detection system 64 and the transducer 66 on the vehicle 62 may remain operational to provide the desired collision avoidance awareness to an operator of the vehicle 62.

Figure 4:
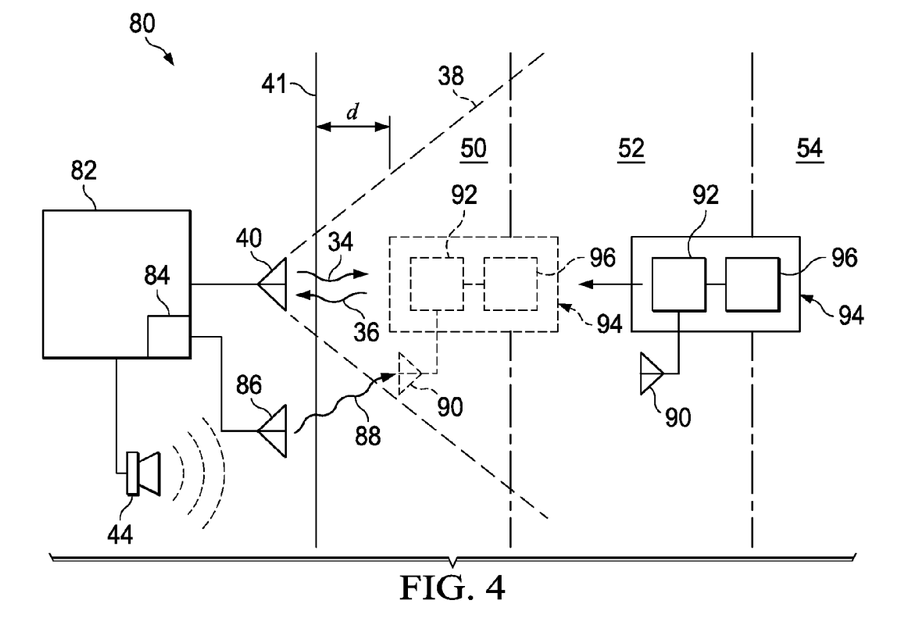
FIG. 4 is a block diagrammatic view of a ground vehicle collision prevention system according to still another embodiment of the invention.

FIG. 4 is a block diagrammatic view of a ground vehicle collision prevention system 80 according to still another embodiment of the invention. Many of the details of the system 80 have been discussed in detail in connection with previous embodiments, and in the interest of brevity, will not be described further. The system 80 includes a proximity detection system 82 operable to generate ranging signals 34 and to detect return signals 36 within the ranging area 38 through at least one transducer 40 that is positioned proximate to the aircraft structural portion 41. The alarm signals generated by the proximity detection system 82 may be communicated to an audio alarm device 44, or other alarm devices. In this embodiment, the proximity detection system 82 further includes a control transmitter 84 that is coupled to a control transmitting transducer 86. The control transmitter 84 is further configured to receive alarm signals generated by the unit 82. The control transmitter 84 and the control transmitting transducer 86 are operable to transmit a control signal 88 to a control receiving transducer 90 that is coupled to a control receiver 92 positioned on a ground service vehicle 94. In one particular embodiment, the control transmitter 84 and the control receiver 92 are configured to transmit the control signal 88 wirelessly. In alternate embodiments, a control wire, cable, or other physical connection may be employed.

Accordingly, the transmitter 84 may communicate the control signal 88 to the receiver 92 by electromagnetic means, including radio frequency (RF) and light, or by ultrasonic means.

Still referring to FIG. 4, the control receiver 92 is coupled to a control system 96 positioned on the vehicle 94 that is operable to stop movement of the vehicle 94 when the critical proximity signal is received. For example, if the vehicle 96 is an electric powered vehicle, the control system 96 may be configured to interrupt current between an electrical power supply and an electric traction motor in the vehicle 96. Alternately, if the vehicle 96 is powered by a conventional gasoline or diesel engine, the control system 96 may be configured to interrupt the operation of an ignition system, or interrupt a fuel flow to the engine, respectively. The control system 96 may be further configured to actuate a vehicle braking system in response to receiving the critical proximity signal, or any combination of the above-referenced actions may be employed.

The operation of the system 80 of FIG. 4 will now be described. When the ground service vehicle 94 is positioned within the far field region 54, or within the intermediate field region 52, alarm signals as previously described may be generated by the proximity detection system 82, which may be relayed to an operator of the vehicle 94 by the audio alarm device 44. When the vehicle 94 moves from the intermediate field region 52 and into the near field region 50, the alarm signal generated by the proximity detection system 82 again changes, and a corresponding audible signal is relayed to the operator of the vehicle 94 by the audio alarm device 44. At a critical distance "d", a critical alarm signal is generated by the proximity detection system 82, which is communicated to the control transmitter 84. The control signal 88 is transmitted to the control receiver 92, which, in turn, communicates an appropriate signal to the control system 96 to stop motion of the vehicle 96.

Figure 5:
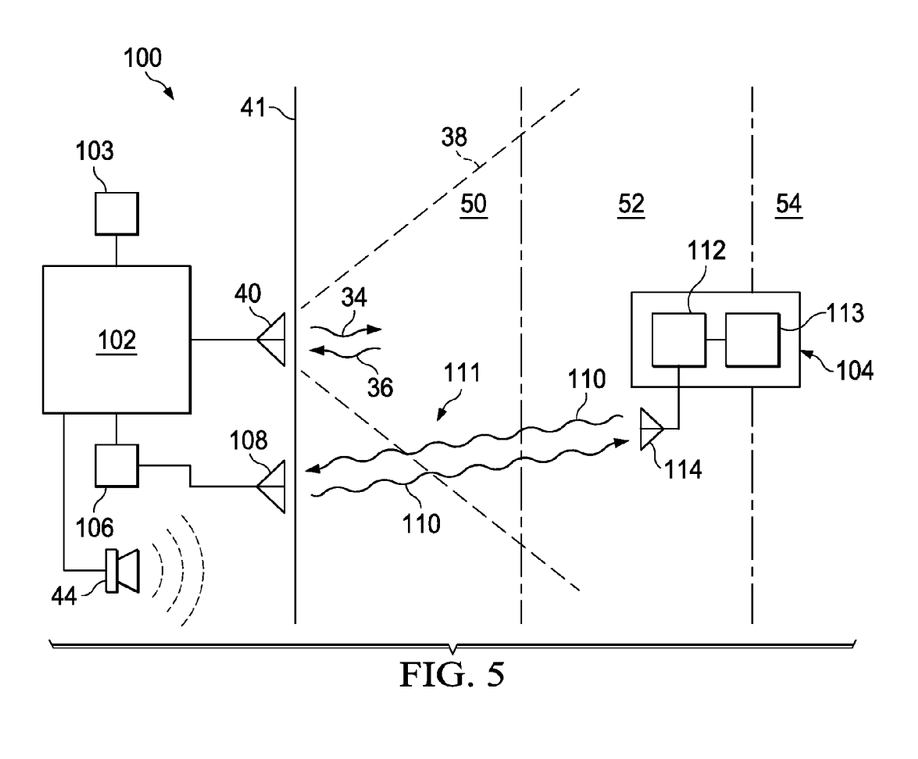
FIG. 5 is a block diagrammatic view of a ground vehicle collision prevention system according to still yet another embodiment of the invention.

FIG. 5 is a block diagrammatic view of a ground vehicle collision prevention system 100 according to still yet another embodiment of the invention. Many of the details of the system 100 have been discussed in detail in connection with previous embodiments, and in the interest of brevity, will not be described further. The system 100 includes a proximity detection system 102 operable to generate ranging signals 34 and to detect return signals 36 within the ranging area 38 through at least one transducer 40. The alarm signals generated by the proximity detection system 102 may be communicated to an audio alarm device 44 or other similar alarm devices in order to inform the operator of a ground service vehicle 104. The proximity detection system 102 further includes an aircraft processor 103 that includes selected information pertaining to the aircraft, as will be discussed in greater detail below.

As further shown in FIG. 5, the proximity detection system 102 also includes a data link transceiver 106 that is coupled to a data link transducer 108. The data link transceiver 106 and the data link transducer 108 are operable to exchange signals 110 with a corresponding data link transceiver 112 through a data link transducer 114, thus comprising a data link 111 between the proximity detection system 102 and the vehicle 104. The data link transducer 112 may be coupled to a data link processor 113 that provides data access and other control functions, as will be explained in detail below. In this embodiment, the data link transceiver 106 and the data link transceiver 112 are configured to communicate the signals 110 wirelessly. Accordingly, the data link transceiver 106 and the data link transceiver 112 may communicate the signals 110 by electromagnetic means, including radio frequency (RF) and light, or by ultrasonic means.

The operation of the system 100 of FIG. 5 will now be described. As the vehicle 104 approaches the aircraft structural portion 41, the proximity detection system 102 determines the position of the vehicle 104 in the manner previously described. The data link 111 further assists the vehicle 104 by exchanging information with the proximity detection system 102. For example, the data link processor 113 may contain a memory device having information regarding the vehicle 104, including vehicle dimensions, which is communicated to the proximity detection system 102 by the data link 111. The aircraft processor 103 correspondingly contains aircraft-related information, which may include information regarding vehicle compatibility. The proximity detection system 102 may accordingly alter the locations of the near field region 50, the intermediate field region 52 and the outer field region 54 depending on the information received from the data link processor 113. Alternately, the data link processor 113 may communicate with the proximity detection system 102 through the data link 111 to determine if the vehicle 104 is compatible with the aircraft on which the proximity detection system 102 is positioned. For example, if a ground service vehicle such as a cargo-loading conveyor (see FIG. 1) is suitable for use with a Boeing Model 737 airplane, the cargo loading conveyor would identify itself to the proximity detection system 102 positioned on 737 airplane through the data link 111. The proximity detection system 102, in turn, accesses the aircraft processor 103 and, assuming the aircraft is a Boeing Model 737, generates a return signal that is transmitted through the data link 111 acknowledging the compatibility. In contrast, if the same conveyor identified itself to a Boeing Model 747 airplane, the conveyor would receive a return signal by means of the data link 111 indicating that the conveyer is not suitable for use with the 747 airplane. An identification of aircraft-ground vehicle compatibility may thus advantageously prevent damage to an aircraft through the use of incompatible equipment.

The ability to communicate signals 110 by means of the data link 111 may afford still other advantages. For example, in still another particular embodiment, the data link 111 may be used to communicate information to the proximity detection system 102 that includes an identity of an operator of the vehicle 104, and if a collision occurs between the vehicle 104 and the aircraft structural portion 41, the data link 111 may be further employed to communicate the time of the collision and the location of the aircraft structural portion 41.

Figure 6:
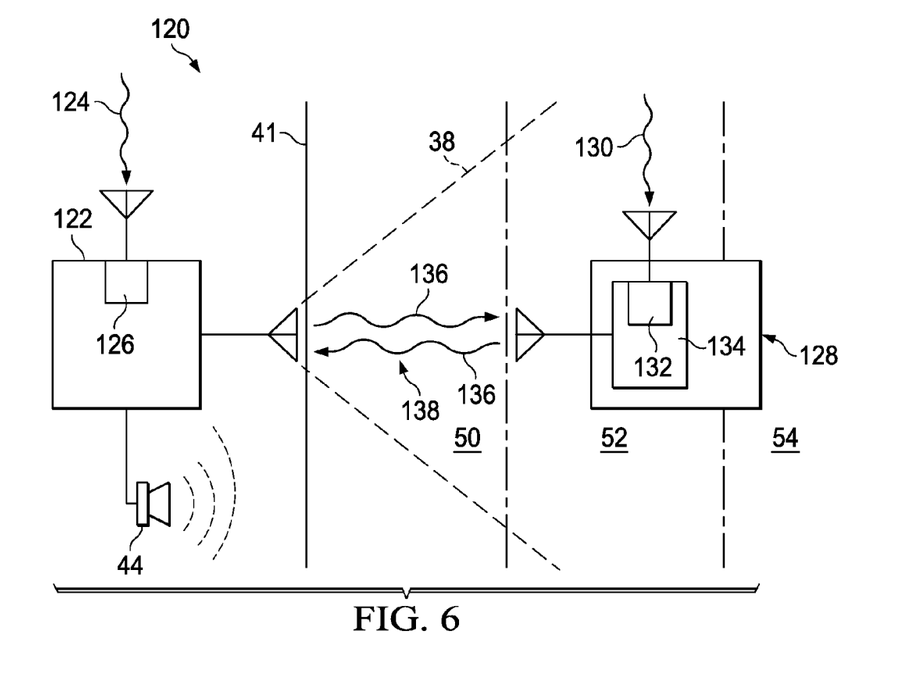
FIG. 6 is a block diagrammatic view of a ground vehicle collision prevention system according to a further embodiment of the invention.

FIG. 6 is a block diagrammatic view of a ground vehicle collision prevention system 120 according to a further embodiment of the invention. The system 120 includes a proximity detection system 122 operable to receive ground position information 124 through a receiver 126, such as a Ground Positioning System (GPS) receiver. A vehicle 128 is similarly configured to receive ground position information 130 through a receiver 132, which may also be a GPS receiver. The receiver 132 is coupled to a transceiver 134 operable to exchange signals 136 with the proximity detection system 122, thus forming a data link 138 between the proximity detection system 122 and the vehicle 128 through which the ground positioning information 124 and the ground positioning information 130 may be exchanged. Accordingly, the ground position information 124 pertaining to the aircraft structural portion 41 and the ground position information 130 of the vehicle 128 may be processed by the proximity detection system 122 to determine a relative distance between the aircraft structural portion 41 and the vehicle 128, and to generate appropriate alarm signals (or control signals, etc.) as the vehicle 128 moves through the ranging area 38.

Figure 7:
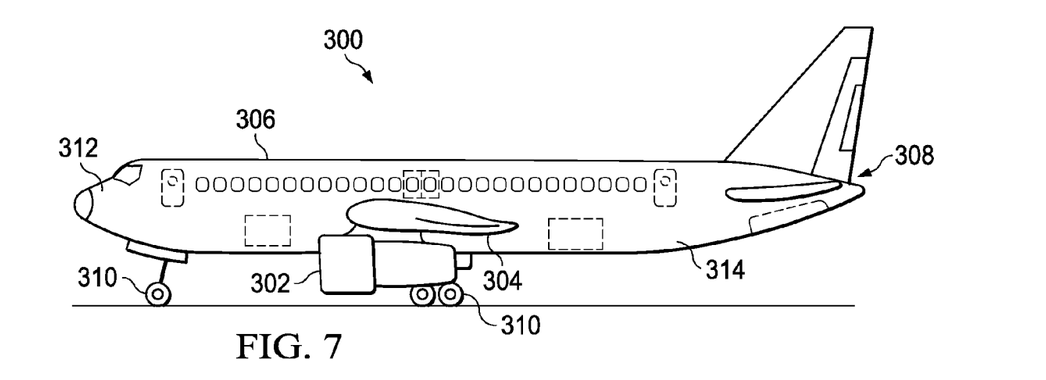
FIG. 7 is a side elevation view of an aircraft having one or more of the disclosed embodiments of the present invention.

Those skilled in the art will also readily recognize that the foregoing embodiments may be incorporated into a wide variety of different systems. Referring now in particular to FIG. 7, a side elevation view of an aircraft 300 having one or more of the disclosed embodiments of the present invention is shown. With the exception of the embodiments according to the present invention, the aircraft 300 includes components and subsystems generally known in the pertinent art, and in the interest of brevity, will not be described further. The aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes other systems and subsystems generally required for the proper operation of the aircraft 300. For example, the aircraft 300 includes a flight control system 312 (not shown in FIG. 7), as well as a plurality of other electrical, mechanical and electromechanical systems that cooperatively perform a variety of tasks necessary for the operation of the aircraft 300. Accordingly, the aircraft 300 is generally representative of a commercial passenger aircraft, which may include, for example, the 737, 747, 757, 767 and 777 commercial passenger aircraft available from The Boeing Company of Chicago, Ill. Although the aircraft 300 shown in FIG. 7 generally shows a commercial passenger aircraft, it is understood that the various embodiments of the present invention may also be incorporated into flight vehicles of other types. Examples of such flight vehicles may include manned or even unmanned military aircraft, rotary wing aircraft, or even ballistic flight vehicles, as illustrated more fully in various descriptive volumes, such as Jane's All the World's Aircraft, available from Jane's Information Group, Ltd. of Coulsdon, Surrey, UK.

With reference still to FIG. 7, the aircraft 300 may include one or more of the embodiments of the ground vehicle collision prevention system 314 according to the present invention, which may operate in association with the various systems and sub-systems of the aircraft 300. Although FIG. 7 shows the one or more embodiments of the ground vehicle collision prevention system 314 as an integral portion of the aircraft 300, one skilled in the art will readily understand that the one or more embodiments of the ground vehicle collision prevention system 314 may also be incorporated into a portable device that may be remotely positioned and separately coupled to the aircraft 300.

Figure 8:
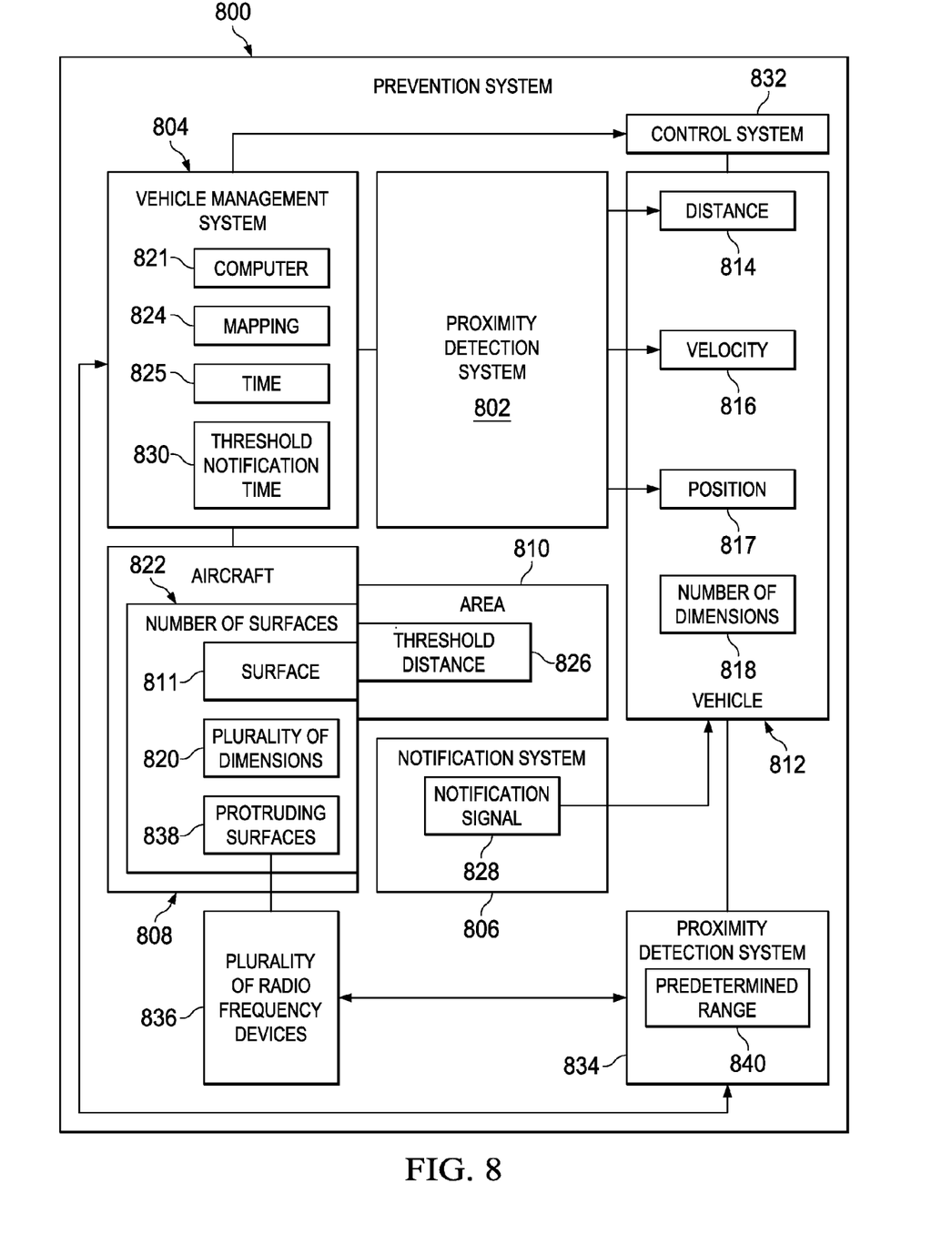
FIG. 8 is a block diagram of a prevention system in accordance with an advantageous embodiment.

With reference now to FIG. 8, a block diagram of a prevention system is depicted in accordance with an advantageous embodiment. In these illustrative examples, prevention system 800 is an example of one implementation of vehicle collision prevention system 30 in FIG. 2. As illustrated, prevention system 800 includes proximity detection system 802, vehicle management system 804, and notification system 806. In these illustrative examples, proximity detection system 802 may be an example of one implementation of proximity detection system 32 in FIG. 2.

As illustrated, proximity detection system 802 is associated with aircraft 808. As used herein, a first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

In these illustrative examples, proximity detection system 802 may be configured to monitor area 810 adjacent to aircraft 808. For example, area 810 may be an area around surface 811 of aircraft 808. Area 810 may also be a range of one or more sensing devices and/or systems associated with proximity detection system 802. Area 810 may be monitored to detect a presence of vehicles or other objects, such as vehicle 812, in area 810. The presence of vehicle 812 in area 810 may indicate that vehicle 812 could contact surface 811 of aircraft 808.

Proximity detection system 802 may be configured to send and receive signals to detect vehicle 812 in area 810. If vehicle 812 is detected in area 810 proximity detection system 802 may detect information regarding vehicle 812. For example, proximity detection system 802 may be configured to determine distance 814 of vehicle 812 from aircraft 808.

In another example, proximity detection system 802 may be configured to determine velocity 816 and an acceleration of vehicle 812 with respect to aircraft 808. Velocity 816 includes a speed of vehicle 812 and a direction vehicle 812 is moving. Velocity 816 of vehicle 812 is also relative to aircraft 808. For example, aircraft 808 may be moving on the ground. Vehicle 812 may not contact aircraft 808 if, for example, vehicle 812 is moving slower than aircraft 808. Aircraft 808 may be passing vehicle 812.

Proximity detection system 802 may further be configured to determine position 817 of vehicle 812 relative to aircraft 808. Position 817 may be based on velocity 816 and distance 814 and may change over time. Further, position 817 is relative to aircraft 808. Position 817 of vehicle 812 may be different for different surfaces of aircraft 808.

Proximity detection system 802 may also be configured to determine number of dimensions 818 of vehicle 812. For example, number of dimensions 818 may be obtained by sensing various portions of vehicle 812 and determining different distances to the various portions of vehicle 812. In another example, number of dimensions 818 may be obtained by identifying a type of vehicle of vehicle 812. For example, proximity detection system 802 may determine a model number for vehicle 812. Based on the model number, known vehicle specifications for vehicle 812 may be obtained from a database.

In these illustrative examples, vehicle management system 804 is operably connected to proximity detection system 802. Vehicle management system 804 receives the information determined about vehicle 812 from proximity detection system 802.

Vehicle management system 804 also receives information regarding aircraft 808. For example, vehicle management system 804 may receive plurality of dimensions 820 of number of surfaces 822 of aircraft 808. Number of surfaces 822 may include for example, without limitation, a portion of a fuselage, an engine, a wing, a flap, a rudder, an elevator, a wheel, an antenna, a nose, a tail, a door, a fuel tank cover, a waste tank cover, a water tank cover, and/or any other surface of an aircraft that may be contacted.

In this example, surface 811 is a surface in number of surfaces 822. Thus, vehicle management system 804 may receive plurality of dimensions 820 of surface 811 that vehicle 812 was detected near.

Plurality of dimensions 820 may be based on a type of aircraft 808. For example, aircraft 808 may be a 787 commercial passenger aircraft available from The Boeing Company of Chicago, Ill. Based on the type and/or model of aircraft 808, plurality of dimensions 820 may be received from a list of known standards and/or specifications. Vehicle management system 804 can calculate position 817 of vehicle 812 to all surfaces of aircraft 808 based on known positions to number of surfaces 822 detected by the proximity detection system 802. In another example, vehicle management system 804 may receive information that flaps of on a wing of aircraft 808 are in a predefined position or are being moved. Thus, the plurality of dimensions 820 may be determined based on operations of aircraft 808 and may change over time.

Vehicle management system 804 is configured to map number of surfaces 822 of aircraft 808 with number of dimensions 818 of vehicle 812 to generate mapping 824. For example, without limitation, mapping 824 may be based on distance 814 of vehicle 812 from aircraft 808, velocity 816 of vehicle 812 relative to aircraft 808, position 817 of vehicle 812 relative to aircraft 808, number of dimensions 818 associated with vehicle 812, and/or plurality of dimensions 820 of number of surfaces 822 of aircraft 808. For example, vehicle management system 804 may include computer 821 to perform a number of calculations to generate mapping 824. Mapping 824 may include a number of distances between the number of surfaces 822 of aircraft 808 and a number of portions of vehicle 812.

In these examples, mapping 824 includes a mapping of aircraft 808 and a mapping of vehicle 812. The mappings of mapping of aircraft 808 and vehicle 812 may be based on static information, such as known dimensions of aircraft 808 and vehicle 812, as discussed above. The mappings of aircraft 808 and vehicle 812 may also be based on dynamic information. For example, flaps, rudders and/or doors of aircraft 808 may be deployed and/or opened. In another example, a ramp, a conveyor belt, and/or cart associated with vehicle 812 may be in a deployed or extended position. In a further example, the ramp or conveyer belt of vehicle 812 may be extending towards aircraft 808. All of this dynamic information may also be included in the mapping of aircraft 808 and ultimately included in mapping 824.

In these illustrative examples, vehicle management system 804 may determine time 825 vehicle 812 will be threshold distance 826 from one of number of surfaces 822 of aircraft 808. For example, vehicle management system 804 may determine which surface in number of surfaces 822 vehicle 812 is likely to contact first. This determination may be based on mapping 824 and velocity 816 of vehicle 812. Threshold distance 826 may be preselected as a minimum amount of space desired between vehicle 812 and any one of number of surfaces 822 of aircraft 808. In other examples, it may be desirable for vehicle 812 to contact surface 811 of aircraft 808. Thus, threshold distance 826 may be less than 1 micron.

In these illustrative examples, notification system 806 is associated with vehicle management system 804. Notification system 806 is configured to generate notification signal 828. Notification signal 828 may be generated if time 825 vehicle 812 will be threshold distance 826 from one of number of surfaces 822 of aircraft 808 is less than threshold notification time 830. For example, threshold notification time 830 may be a threshold amount of time required to prevent vehicle 812 from entering threshold distance 826 of aircraft 808. In another example, threshold notification time 830 may be a threshold amount of time required to stop vehicle 812 before contacting aircraft 808. For example, a response action is not taken within a threshold time window, collision may occur. When time 825 is within a threshold time window, adequate time exists to provide notification signal 828 and prevent the collision. Any time point within the threshold time window shall be defined as threshold notification time 830.

In some embodiments, notification signal 828 may be sent to vehicle 812 using a wireless communication system as previously described in reference to FIG. 5. Notification signal 828 may be received by vehicle 812 and generate a notification. For example, the notification may be an audible and/or visual notification and/or alarm as previously described in reference to FIG. 2. The audible notification may also be generated in headphones worn by an operator of vehicle 812. An audible notification in headphones may be desirable in noisy environments which often exist at airports. In another example, visual notification may a displayed at vehicle 812. The visual notification may be displayed using, for example, a graphical user interface. The audible and/or visual notification may include an indication of distance 814 of vehicle 812 from aircraft 808. The audible and/or visual notification may also include an indication of time 825 that vehicle 812 will be threshold distance 826 from one of number of surfaces 822 of aircraft 808.

In other embodiments, threshold notification time 830 may be subdivided into a first notification time range and a second notification time range. Any number of different notification signals may be generated as previously described in reference to FIG. 2.

In these illustrative examples, prevention system 800 may further include control system 832. Control system 832 may be an example of one implementation of control system 96 in FIG. 4. Control system 832 may be configured to prevent vehicle 812 from entering threshold distance 826 of aircraft 808. For example, control system 832 may be configured to prevent vehicle 812 from contacting aircraft 808.

In another example, control system 832 may be configured to control deceleration of vehicle 812. It may be desirable for vehicle 812 to contact surface 811 of aircraft 808. For example, without limitation, vehicle 812 may be or include a fuel truck, a galley cart, a waste removal vehicle, a ramp, conveyor belt, and/or any other object that may be desired to contact aircraft 808. Control system 832 may control deceleration of vehicle 812 such that a portion of vehicle 812 contacts surface 811 of aircraft 808 at or below a predetermined velocity. The predetermined velocity may be selected to prevent any issues that may arise from vehicle 812 contacting aircraft 808. In one example, the predetermined velocity is zero miles per hour. Thus, vehicle 812 may be stopped just before contacting surface 811 of aircraft 808. At this point, actual contact may be performed manually.

In these illustrative examples, prevention system 800 may further include proximity detection system 834 associated with vehicle 812. Proximity detection system 834 may be an example of one implementation of proximity detection system 64 in FIG. 3. Proximity detection system 834 may send and receive signals to detect aircraft 808. For example, additional information regarding velocity 816 and position 817 of vehicle 812 may be determined by proximity detection system 834. The additional information may be sent to vehicle management system 804. Vehicle management system 804 may use the additional information from proximity detection system 834 to improve accuracy of calculations used to form mapping 824 and to determine time 825. Improved accuracy may be desirable in situations where vehicle 812 is supposed to contact aircraft 808. Thus, vehicles that regularly contact aircraft 808 may include proximity detection system 834.

In some advantageous embodiments, aircraft 808 includes plurality of radio frequency devices 836. Plurality of radio frequency devices 836 is associated with number of surfaces 822 of aircraft 808. Plurality of radio frequency devices 836 are configured to send information regarding dimensions of surfaces in number of surfaces 822 of the aircraft 808 in response to receiving a signal. For example, plurality of radio frequency devices 836 may be radio frequency identification tags positioned on surfaces in number of surfaces 822 of aircraft 808.

In these illustrative examples, plurality of radio frequency devices 836 may be passive devices. Information regarding plurality of radio frequency devices 836 may be obtained by a signal reaching one of plurality of radio frequency devices 836. In another example, plurality of radio frequency devices 836 may be active devices. Plurality of radio frequency devices 836 may be connected to a power source and may generate a signal in response to receiving a signal.

In one embodiment, proximity detection system 834 may generate a radio frequency signal. Information from plurality of radio frequency devices 836 on aircraft 808 may be received at proximity detection system 834. The information may include dimension, and position, and/or proximity information of a surface in number of surfaces 822 on aircraft 808. In one example, the information may also include an identifier of the radio frequency device. The identifier may be located on a mapping of aircraft 808 to locate a position of the radio frequency device on aircraft 808.

Additionally, proximity detection system 834 may determine a distance the surface is from vehicle and a speed of the surface relative to the vehicle. For example, this distance and speed may be based on a time delay between sending a signal and receiving a reflection of the signal. For example, the speed and distance may be determined using a radio frequency detection and ranging apparatus.

Additionally, proximity detection system 834 may receive information from radio frequency devices in plurality of radio frequency devices 836 within predetermined range 840 of proximity detection system 834. For example, the signals sent by proximity detection system 834 may only have a certain range. In other examples, proximity detection system 834 may determine whether the signals received were of a certain signal strength or other quality. If the signal is not of the certain strength or other quality proximity detection system 834 may determine that the radio frequency device from which the signal was received is not within predetermined range 840. Then, proximity detection system 834 may discard the signal. Selection of predetermined range 840 allows surfaces of aircraft 808 in proximity of vehicle 812 to be detected. Thus, proximity detection system 834 may only receive information regarding surfaces of aircraft 808 within predetermined range 840 of proximity detection system 834.

In these illustrative examples, vehicle 812 may be configured to detect and avoid contacting surfaces on aircraft 808 using proximity detection system 834. For example, protruding surfaces 838 may be positioned on portions of aircraft 808. Protruding surfaces 838 are surfaces on aircraft 808 that extend beyond normal fuselage and wing boundaries and may be susceptible to damage by vehicle 812. For example, protruding surfaces 838 may include antennas, pitot tubes, drain tubes, a tail scrape indicator, and/or any other surfaces the may protrude from aircraft 808. One of plurality of radio frequency devices 836 may be positioned in association with protruding surfaces 838. Proximity detection system 834 can detect protruding surfaces 838 at vehicle 812 by broadcasting and receiving signals. Thus, an operator of vehicle 812 may be notified of protruding surfaces 838 without receiving notification signal 828 from notification system 806 associated with aircraft 808.

The illustration of prevention system in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, prevention system 800 may not include proximity detection system 834 or control system 832. Information regarding vehicles in area 810 may be detected and broadcast by devices associated with aircraft 808. In other examples, time 825 may be determined by proximity detection system 802 without generating mapping 824. Yet in other examples, components of notification system 806 may be included in both aircraft 808 and vehicle 812.

Figure 9:
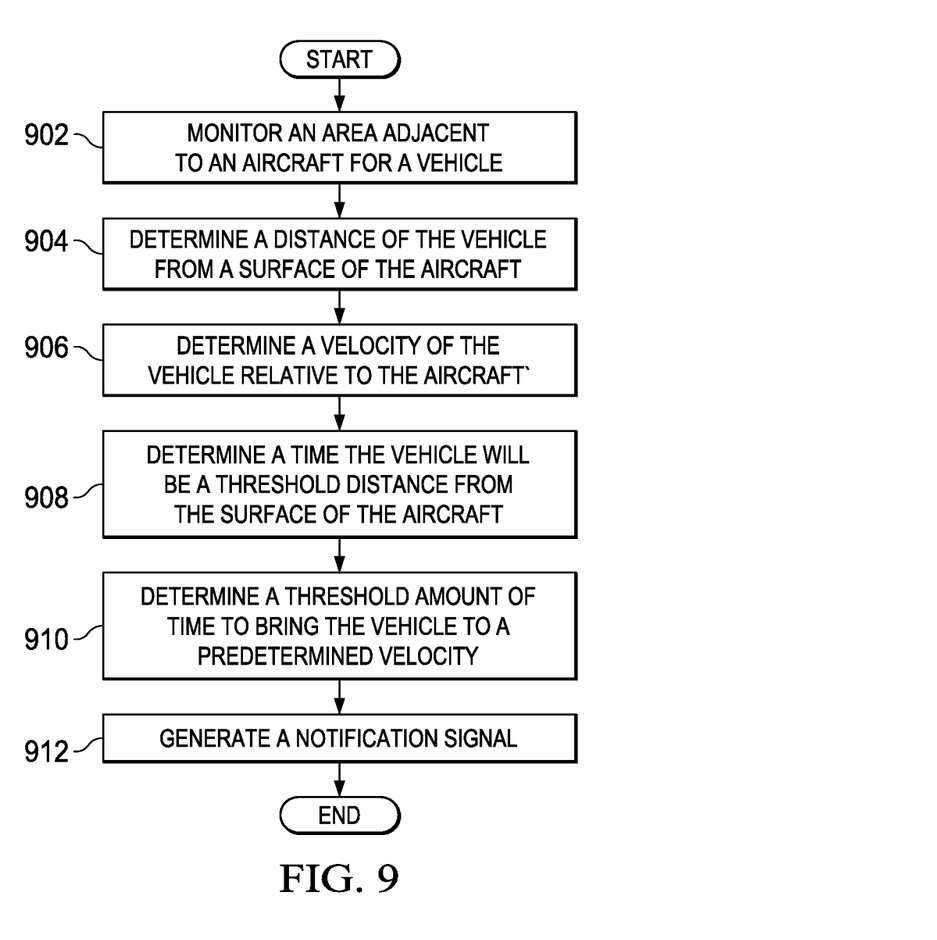
FIG. 9 is a flow chart of a process for detecting a vehicle in accordance with an advantageous embodiment.

With reference now to FIG. 9, a flow chart for a process for detecting a vehicle is depicted in accordance with an advantageous embodiment. The process may be implemented using a prevention system, such as prevention system 800 in FIG. 8.

The process begins by monitoring an area adjacent to an aircraft for a vehicle (operation 902). In operation 902, the area may be monitored using a transducer associated with the aircraft. The transducer may be part of a proximity detection system, such as proximity detection system 802 in FIG. 8. Then the process determines a distance of the vehicle from a surface of the aircraft (operation 904). The process also determines a velocity of the vehicle relative to the aircraft (operation 906). Operation 904 and 906 may be performed responsive to detecting the vehicle within the area adjacent to the aircraft. The velocity and distance may be determined using the proximity detection system. Additionally, the proximity detection system may be used to determine a position of the vehicle relative to the aircraft and a number of dimensions associated with the vehicle.

Thereafter, the process determined a time the vehicle will be a threshold distance from the surface of the aircraft (operation 908). In operation 908, the time may be determined using a vehicle management system, such as vehicle management system 804 in FIG. 8. The time may be determined using a mapping of a number of dimensions associated with the vehicle with a plurality of dimensions associated with a number of surfaces of the aircraft. In operation 908, a portion of the vehicle that will be the threshold distance from the surface of the aircraft may be determined based on the mapping and the velocity of the vehicle relative to the aircraft.

The process then determines a threshold amount of time to bring the vehicle to a predetermined velocity (operation 910). In operation 910, the threshold amount of time may be based on deceleration capabilities of the vehicle. For example, the vehicle may be user operated and a reaction time may be added to the amount of time. Further, the predetermined velocity may be selected to allow an operator of the vehicle to avoid contacting the aircraft. In another example, it may be desirable to bring the vehicle to a stop before contacting the aircraft. Thus, the predetermined velocity may be zero. Thereafter the process, generates a notification signal (operation 912), with the process terminating thereafter.

In operation 912, the notification signal may be generated in responsive to a determination that the time is less than the threshold amount of time. The notification signal may be sent to the vehicle. The process may further provide an automated control signal to cause to the vehicle to perform certain actions. For example, without limitation, the automated control signal may cause the vehicle to break, stop, slow down, and/or adjust a current course of direction of the vehicle and/or any components of the vehicle.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a proximity detection system associated with an aircraft and operably connected to a transducer, the proximity detection system configured to determine a distance of a vehicle from a surface of the aircraft and a velocity of the vehicle relative to the aircraft;
   a vehicle management system operably connected to the proximity detection system, the vehicle management system configured to determine a time the vehicle will be a threshold distance from the surface of the aircraft and an threshold amount of time to bring the vehicle to a predetermined velocity; and
   a notification system associated with the proximity detection system and configured to generate a notification signal in response to a determination that the time is less than the threshold amount of time.

2. The apparatus of claim 1 further comprising:
   a control system associated with the vehicle, the control system configured to reduce the velocity of the vehicle in response to receiving the notification signal from the notification system.

3. The apparatus of claim 2, wherein the distance is a first distance and further comprising:
   a first transceiver operably connected to the control system and configured to send and receive signals to and from a second transceiver operably connected to the proximity detection system, wherein the signals include information regarding a second distance of a portion of the vehicle from the surface of the aircraft, wherein the control system is further configured to control a deceleration of the vehicle such that the portion of the vehicle one of stops prior to contacting the aircraft and contacts the surface of the aircraft at or below a threshold velocity.

4. The apparatus of claim 3, wherein the proximity detection system is an aircraft-based proximity detection system and wherein the velocity is a first velocity, and further comprising:
   a vehicle-based proximity detection system operably connected to the first transceiver, the vehicle-based proximity detection system configured to determine the second distance of the portion of the vehicle from the surface of the aircraft and a second velocity of the vehicle relative to the aircraft.

5. The apparatus of claim 2 further comprising:
   a braking system associated with the vehicle and operably connected to the control system, the braking system configured to bring one of the vehicle and a component of the vehicle to a stop before reaching the threshold distance from the aircraft in response to receiving the notification signal from the notification system.

6. The apparatus of claim 1 further comprising:
   a receiver associated with the vehicle, the receiver configured to receive the notification signal; and
   a notification device operably connected to the receiver, the notification device configured to generate a notification of the aircraft at the vehicle.

7. The apparatus of claim 6, wherein the notification device comprises at least one of an audio alarm device and a visual alarm device.

8. The apparatus of claim 7 further comprising:
   a graphical user interface associated with the notification device, the graphical user interface configured to display a visual indication of the distance between the surface of the aircraft and the vehicle.

9. The apparatus of claim 1, wherein the proximity detection system is an aircraft-based proximity detection system, wherein the distance is a first distance, wherein the velocity is a first velocity, wherein the time is a first time, and further comprising:
   a vehicle-based proximity detection system configured to determine a second distance of the vehicle from the surface of the aircraft and a second velocity of the vehicle relative to the aircraft and configured to determine a second time the vehicle will be the threshold distance from the surface of the aircraft in response to determining the second distance and the second velocity of the vehicle relative to the aircraft; and
   a notification device operably connected to the vehicle-based proximity detection system, the notification device configured to receive the notification signal from the notification system associated with the aircraft and configured to generate a notification of the aircraft at the vehicle in response to one of receiving the notification signal from the notification system associated with the aircraft and a determination that the second time is less than the threshold amount of time.

10. The apparatus of claim 1, wherein the threshold amount of time is subdivided into at least a first notification time range and a second notification time range, wherein the notification system is configured to generate a first notification signal in response to a determination that the time is within the first notification time range and to generate a second notification signal in response to a determination that the time is within the second notification time range.

11. The apparatus of claim 10, wherein the first notification time range includes a range of times that is greater than a range of times in the second notification time range, wherein the first notification signal comprises an intermittent audible tone at a selected audio frequency, and wherein the second notification signal comprises a steady audible tone at a selected audio frequency.

12. The apparatus of claim 1, wherein the apparatus is a first apparatus and wherein the proximity detection system includes a second apparatus selected from a group comprising at least one of a radio frequency detection and ranging apparatus (RADAR) wherein the transducer comprises an antenna suited for use at microwave radio frequencies, a light frequency detection and ranging apparatus (LIDAR) wherein the transducer comprises a photo emitter and photo detector suited for use at light frequencies, and an ultrasonic detection and ranging apparatus wherein the transducer comprises an ultrasonic transducer.

13. A prevention system comprising:
a proximity detection system associated with an aircraft and operably connected to a transducer, the proximity detection system configured to identify a distance of a vehicle from the aircraft, a velocity of the vehicle relative to the aircraft, a position of the vehicle relative to the aircraft, and a number of dimensions associated with the vehicle in response to detecting the vehicle within an area adjacent to the aircraft;
a vehicle management system associated with the aircraft and operably connected to proximity detection system, the vehicle management system configured to receive information regarding a plurality of dimensions associated with a number of surfaces of the aircraft, map the number of dimensions associated with the vehicle with the plurality of dimensions associated with the number of surfaces of the aircraft based on the position of the vehicle relative to the aircraft to form a mapping, determine a portion of the vehicle that will be a threshold distance from a surface in the number of surfaces of the aircraft based on the mapping and the velocity of the vehicle relative to the aircraft, determine a time the portion of the vehicle will be the threshold distance from the surface of the aircraft based on the mapping and the velocity of the vehicle relative to the aircraft, and determine a threshold amount of time to bring the vehicle to a predetermined velocity; and
a notification system associated with the vehicle management system and configured to generate a notification signal in response to a determination that the time is less than the threshold amount of time.

14. The prevention system of claim 13 further comprising:
a control system associated with the vehicle, the control system configured to reduce the velocity of the vehicle to bring one of the vehicle and a component of the vehicle to a stop before reaching the threshold distance from the aircraft in response to receiving the notification signal from the notification system.

15. The prevention system of claim 13 further comprising:
a receiver associated with the vehicle, the receiver configured to receive the notification signal; and
a notification device operably connected to the receiver, the notification device configured to generate one of an audible notification of the aircraft at the vehicle and a visual notification of a current distance between the surface of the aircraft and the portion of vehicle at the vehicle.

16. The prevention system of claim 13, wherein the proximity detection system is an aircraft-based proximity detection system and the surface is a first surface and further comprising:
a plurality of radio frequency devices associated with the number of surfaces of the aircraft, the plurality of radio frequency devices configured to send at least one of identification information, dimensional information, and proximity information of a second surface in the number of surfaces of the aircraft in response to receiving a detection signal;
a vehicle-based proximity detection system associated with the vehicle and configured to send the detection signal to a radio frequency device of the plurality of radio frequency devices within a predetermined range of the vehicle and receive the information regarding the dimensions of the second surface, wherein the vehicle-based proximity detection system is further configured to determine a current distance between the second surface of the aircraft and the vehicle based on the information received and a time delay associated with the detection signal; and
a notification device operably connected to the vehicle-based proximity detection system, the notification device configured to generate on of an audible notification of the aircraft at the vehicle and a visual notification of the current distance between the second surface of the aircraft and the vehicle.

17. The prevention system of claim 13, wherein the proximity detection system is configured to identify a type of the vehicle and retrieve the number of dimensions associated with the vehicle from a database storing dimensions of a number of different types of vehicles to determine the number of dimensions associated with the vehicle.

18. A method for detecting vehicles, the method comprising:
monitoring an area adjacent to an aircraft for a vehicle, wherein the area is monitored using a transducer associated with the aircraft;
responsive to detecting the vehicle within the area adjacent to the aircraft, determining a distance of the vehicle from a surface of the aircraft and a velocity of the vehicle relative to the aircraft;
determining, using a processing unit, a time the vehicle will be a threshold distance from the surface of the aircraft;
determining a threshold amount of time to bring the vehicle to a predetermined velocity; and
responsive to a determination that the time is less than the threshold amount of time, generating a notification signal.

19. The method of claim 18 further comprising:
responsive to detecting the vehicle within the area adjacent to the aircraft, identifying a position of the vehicle relative to the aircraft and a number of dimensions associated with the vehicle;
receiving information regarding a plurality of dimensions associated with a number of surfaces of the aircraft;
mapping the number of dimensions associated with the vehicle with the plurality of dimensions associated with the number of surfaces of the aircraft based on the position of the vehicle relative to the aircraft to form a mapping; and
determining a portion of the vehicle that will be the threshold distance from the surface of the aircraft based on the mapping and the velocity of the vehicle relative to the aircraft.

20. The method of claim 18 further comprising:
sending the notification signal; and
responsive to receiving the notification signal, reducing the velocity of one of the vehicle and a component of the vehicle to bring the vehicle to a predetermined velocity before reaching the threshold distance from the aircraft.

21. The method of claim 18 further comprising:
sending the notification signal; and
responsive to receiving the notification signal, generating one of an audible notification of the aircraft at the vehicle and a visual notification of a current distance between the surface of the aircraft and the portion of vehicle at the vehicle.

\* \* \* \* \*